United States Patent
Hansen

Patent Number: 5,547,268
Date of Patent: Aug. 20, 1996

[54] TRACTION DEVICE FOR TRACKED VEHICLE

[76] Inventor: David W. Hansen, 818 E. Savannah Dr., Sandy, Utah 84098

[21] Appl. No.: 255,226

[22] Filed: Jun. 7, 1994

Related U.S. Application Data

[63] Continuation-in-part of Ser. No. 843,768, Feb. 28, 1992, Pat. No. 5,318,141.

[51] Int. Cl.$^6$ .................................................. B62D 55/28
[52] U.S. Cl. ............................................ 305/191; 305/46
[58] Field of Search ............................ 305/35 R, 35 EB, 305/38, 46, 51, 54

[56] References Cited

U.S. PATENT DOCUMENTS

| | | | |
|---|---|---|---|
| 2,404,488 | 7/1946 | Hait | 305/54 X |
| 3,799,626 | 3/1974 | Kilbane, Jr. | 305/35 EB |
| 4,758,055 | 7/1988 | Anderson | 305/54 X |
| 4,938,546 | 7/1990 | Simmons | 305/46 X |
| 5,201,574 | 4/1993 | James et al. | 305/54 X |

*Primary Examiner*—Russell D. Stormer
*Attorney, Agent, or Firm*—Townsend and Townsend and Crew

[57] ABSTRACT

An improved unit having a base and a plurality of teeth integral with the base and projecting outwardly therefrom. The teeth and base are formed of a suitable elastomeric material, such as natural rubber or urethane rubber. The teeth have conical outer surface and V-shaped notches or openings between adjacent teeth. The teeth have flat, angled surfaces. There are two rows of teeth on each base, respectively, and the teeth are aligned with each other front to back. The base is beveled so that each tooth will have maximum area at the root thereof.

13 Claims, 2 Drawing Sheets

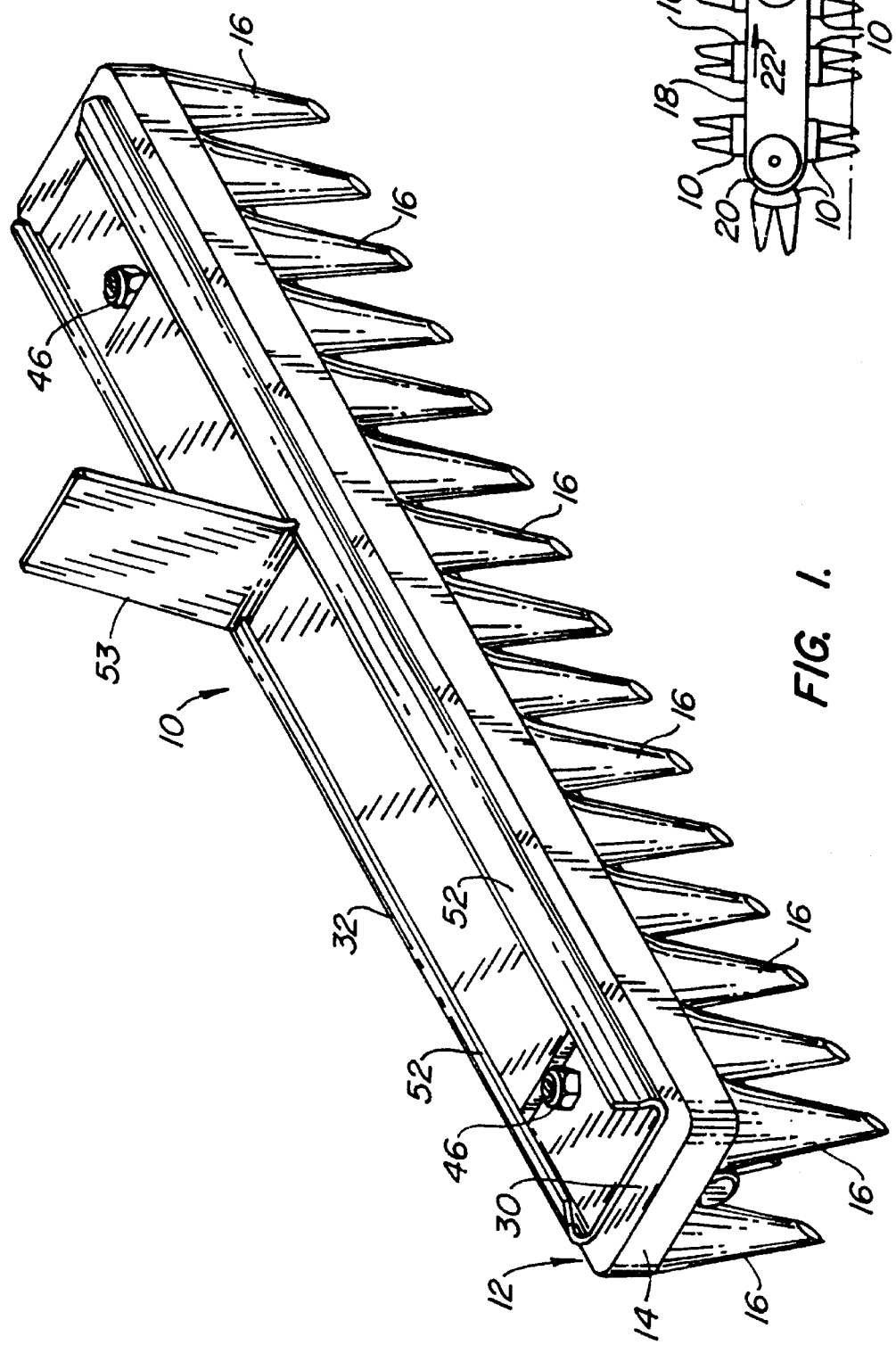

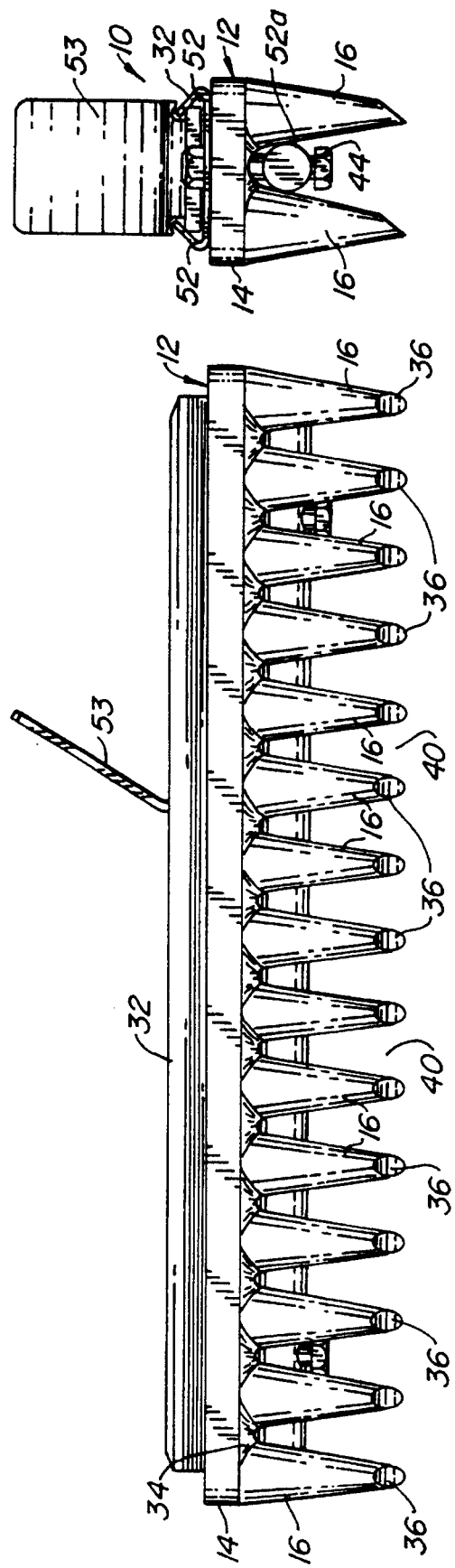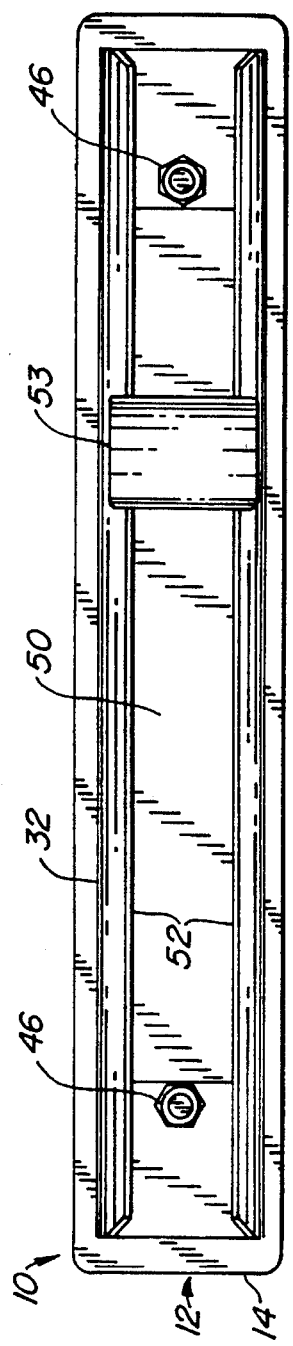

TRACTION DEVICE FOR TRACKED VEHICLE

This is a continuation-in-part application of U.S. patent application Ser. No. 07/843,768, filed Feb. 28, 1992, entitled "*LOW IMPACT TRACKED VEHICLES*", now U.S. Pat. No. 5,318,141, issued Jun. 7, 1994.

This invention relates to improved vehicles having tracks for motive force over rough terrain and in and through water and, more particularly, to a grouser of designed especially for attachment to the outer surfaces of endless, flexible tracks to increase the traction thereof.

BACKGROUND OF THE INVENTION

In U.S. patent application Ser. No. 07/843,768, filed Feb. 28, 1992, entitled "*LOW IMPACT TRACKED VEHICLES*", now U.S. Pat. No 5,318,141, issued Jun. 7, 1994, an improved vehicle is described in a pair of endless, flexible tracks at the sides thereof provide the motive force to the vehicle to cause it to move forwardly and in turns. The vehicle can be driven over most terrain, including soft snow and mud without causing substantial damage to the terrain. The vehicle can also be used to transport men and equipment from ship to shore and from the shore to land access roads spaced a considerable distance from the shore.

A feature of the vehicle of the above patent application is an improved grouser assembly made up of a number of spaced grousers which are attached to the tracks to provide traction therefor. While this grouser assembly is satisfactory in many instances of use, it can be improved upon by providing a grouser unit with greater surface area and greater strength. Thus, greater traction forces can be realized for the tracks. The present invention satisfies a need for an improved grouser unit which achieves this aim.

SUMMARY OF THE INVENTION

The present invention is directed to an improved grouser unit having a base provided with a plurality of teeth integral with the base and projecting 10 outwardly therefrom in a direction away from the track on which the grouser unit is attached. The teeth and base are formed from a suitable elastomeric material, such as natural rubber or urethane rubber. The teeth are integral with the base extend outwardly from the base and have conical outer surfaces.

The teeth have V-shaped notches or openings between adjacent teeth and the outer ends of the teeth have flat, angled surfaces which face the direction of forward movement when the teeth are on the upper reach or stretch of the track.

There are two rows of teeth on each base, respectively, and the teeth are aligned with each other front to back. Moreover, the outer face of the base is beveled so that the base or largest end portion of each tooth will have maximum area at the root thereof or at the region where the tooth is integral with the base.

Any suitable fastening device can be used to couple the grouser base transversely to an existing track of a tracked vehicle. For purposes of illustration, such a fastening device includes an elongated channel member having a flat main body portion which mates with the flat innermost surface of the base of the grouser. The channel member has a pair of side flanges which bend over to form side channels for the insertion of a rigid bar of metal carried by the track. The channel member is received by a bolt near each end of the grouser base and the bolt is also passed through the base and through a tensioning rod which extends along the length of the grouser base and is in the space between the front and back rows of the teeth. Thus, the channel member, the base and the rod form a truss which renders the grouser relatively resilient so that, even though the grouser may be deformed as it moves over terrain of various types, the truss-like construction of the aforesaid components assures that the grouser will return to its initial position and condition after passing over the rough terrain.

The primary object of the present invention is to provide an improved grouser unit for a tracked vehicle wherein the grouser has conical teeth and the teeth are integral with a base which can be removably secured in any suitable manner to a track of a tracked vehicle with the teeth projection outwardly and away from the track of the vehicle whereby the teeth shear strength extend the operating life of the grouser without limiting the movement over rough terrain.

Other objects of the present invention will become apparent as the following specification progresses, reference being had to the accompanying drawings for an illustration of the invention.

BRIEF DESCRIPTION OF THE DRAWINGS

FIG. 1 is perspective view of the improved grouser unit of the present invention;

FIG. 1A is a schematic view of an endless, flexible track with the grousers of the present invention mounted thereon;

FIG. 2 is a rear elevational view of the grouser unit showing the way in which the grousing unit would look on the lower stretch of an endless, flexible track of a tracked vehicle;

FIG. 3 is an end elevational view of the grousing unit looking from right to left from FIG. 2; and FIG. 4 is a top plan view of the grouser unit of FIG. 2.

DETAILED DESCRIPTION OF THE PREFERRED EMBODIMENT

The traction device or grouser unit of the present invention is broadly denoted by the numeral 10 and includes a grouser 12 having a base 14 and a plurality of conical teeth 16 which project outwardly from the base at one face thereof. The teeth 16 are in two rows as shown in FIGS. 1, 1A and 3.

A number of spaced grouser units 10 are, when in use, shown in FIG. 1A as being secured to an endless flexible track 18 wound about and coupled to a pair of wheels 20 and forming part of a vehicle (not shown) for movement over terrain of different types. Each unit 10 is at a specific location on the track when the direction of travel is, for example, in the direction of arrow 22 as the track and wheels 18 and 20, respectively, move over the ground 24.

Base 14 is generally rectangular in configuration and has a flat surface 30 against which a channel member 32 is placed. Base 14 also has a beveled surface 34 adjacent to each tooth 16, respectively, each tooth 16 having a conical outer surface. Each tooth is integral with the base 14 adjacent to surface 34 of the base. Thus, the beveling of the base at the root or base of each tooth provides additional mass and assists in preventing a tendency for the tooth to shear.

Each tooth 16 has a flat, angled surface 36 which faces downstream when the grouser 12 is on the upper stretch of the track 18 (FIG. 1A) with reference to the direction of travel of the track denoted by arrow 22. Thus, the surfaces 36 will be facing rearwardly when the grouser unit 12 is on the lower stretch of the track as shown in FIG. 2. This configuration can be of other shapes and types, if desired, such as bullet-shaped.

Between each pair of adjacent teeth in each row, there is an inverted V-shaped recess 40 which provides latitude for the adjacent tooth 16 to move about in all directions relative to the base 14.

A metallic rod 52*a* is between the rows of teeth 16 as shown in FIG. 3. This rod is snugly placed adjacent to and slightly below the lower surface of base 14. A bolt 44 passes upwardly through the rod at each end thereof, respectively, as shown in FIG. 2 and this rod passes upwardly through base 14 and through the member 32 as shown in FIG. 4. A nut 46 is threaded onto the upper end of the bolt and anchors a plate 50 having an inclined tab 53 thereon, for securing the grouser 12 to a track 18. Member 32 has a pair of side flanges 52 which form channels for receiving hardware on the track 18 for connecting the grouser 12 to the track. Other means of fastening can be provided if desired.

In use, each grouser unit 10 is affixed to track 18 in any suitable manner, such as by the use of channel member 32. The teeth 16 of each unit 10 will project outwardly from track 18 and be flexible with respect to base 14 so that the grouser unit can move over rough terrain of all types without fear of being separated from the base by a shearing action. If there is wear on the teeth, the grouser unit 10 can be replaced by a new grouser unit in a simple and expeditious manner.

I claim:

1. A traction unit for an endless, flexible track of a vehicle comprising:

a body having a plurality of flexible teeth aligned in one or more rows thereon, said body being adapted for connection to said track with at least one row of teeth extending transversely of said track and projecting outwardly therefrom, said teeth being conical.

2. A traction unit as set forth in claim 1, wherein the body includes a base having a pair of opposed faces, the teeth being secured to one of the faces thereof.

3. A traction unit as set forth in claim 2, wherein the teeth are integral with the one face of the base.

4. A traction unit as set forth in claim 1, wherein the material of the teeth is an elastomeric material.

5. A traction unit as set forth in claim 4, wherein the elastomeric material of the teeth is natural rubber.

6. A traction unit as set forth in claim 4, wherein the elastomeric material of the teeth is urethane rubber.

7. A traction unit as set forth in claim 4, wherein the elastomeric material of the teeth is taken from the group consisting of natural rubber and urethane rubber.

8. A traction unit as set forth in claim 1, wherein the teeth are arranged in two rows extending transversely of the traction device when the body is secured to the traction device.

9. A traction unit as set forth in claim 1, wherein said body has a base, said base being integral with the teeth and provided with a beveled outer surface, said teeth projecting outwardly from said beveled surface.

10. A traction unit as set forth in claim 8, wherein is included securing means including a plate for securing the base to the track, and rod means carried by the base between the adjacent rows of teeth for securing the base to the plate.

11. A traction unit as set forth in claim 1, wherein each tooth has a central axis, the central axes of the teeth being generally parallel with each other.

12. A traction unit as set forth in claim 1, wherein the outer end of each tooth has a flat beveled surface.

13. A traction unit as set forth in claim 1, wherein each pair of adjacent teeth has a V-shaped recess therebetween.

* * * * *